United States Patent [19]

Athey, Jr.

[11] Patent Number: 4,981,762
[45] Date of Patent: * Jan. 1, 1991

[54] SEAM FOR IMPENETRABLE MATERIAL

[75] Inventor: Robert D. Athey, Jr., El Cerrito, Calif.

[73] Assignee: Athey Barrier Construction Inc., El Cerrito, Calif.

[*] Notice: The portion of the term of this patent subsequent to Feb. 21, 2006 has been disclaimed.

[21] Appl. No.: 298,687

[22] Filed: Jan. 19, 1989

Related U.S. Application Data

[63] Continuation-in-part of Ser. No. 140,383, Jan. 4, 1988, Pat. No. 4,806,435.

[51] Int. Cl.$^5$ ................................................. B32B 3/10
[52] U.S. Cl. ..................................... 428/594; 428/625; 428/626; 52/408; 405/128; 405/270
[58] Field of Search .............. 428/594, 625, 626, 457; 52/408, 468; 405/38, 128, 176, 270

[56] References Cited

U.S. PATENT DOCUMENTS

| | | | |
|---|---|---|---|
| 4,588,646 | 5/1986 | Athey | 428/457 |
| 4,589,804 | 5/1986 | Paeglis et al. | 405/270 |
| 4,806,435 | 2/1989 | Athey | 428/594 |
| 4,818,629 | 4/1989 | Jenstrom et al. | 428/594 |

Primary Examiner—Theodore Morris
Assistant Examiner—George Wyszomierski
Attorney, Agent, or Firm—Bielen, Peterson & Lampe

[57] ABSTRACT

A seal for connecting abutting first and second elastomeric sheets having overlying metallic portions including an elastomeric strip. The elastomeric strip is bonded to the elastomeric portions of the first and second sheets. An electrically conductive filler is attached to the metallic portions of the abutting sheets. A metallic layer is then plated to the conductive filler. A layer of flexible and abrasion resistant material adheres to the metallic plate and the metallic portions of the abutting sheets.

8 Claims, 2 Drawing Sheets

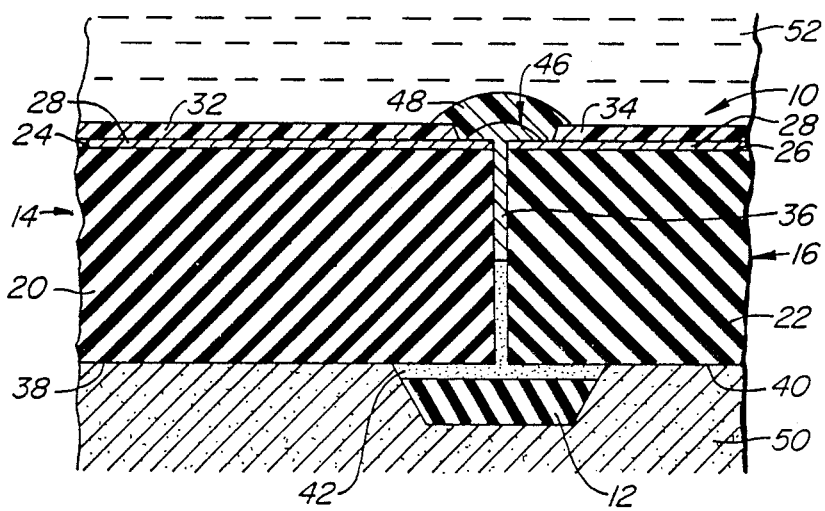
FIG._1.
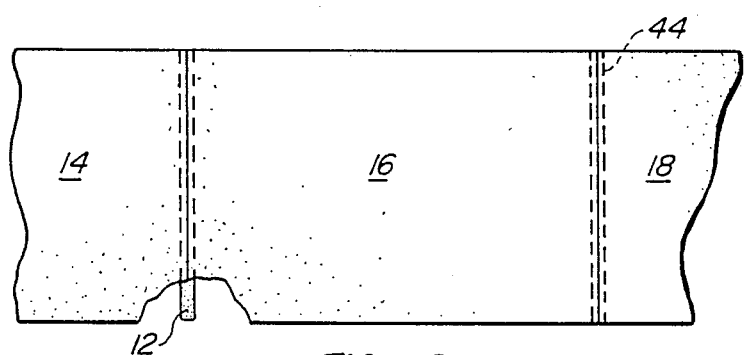
FIG._2.
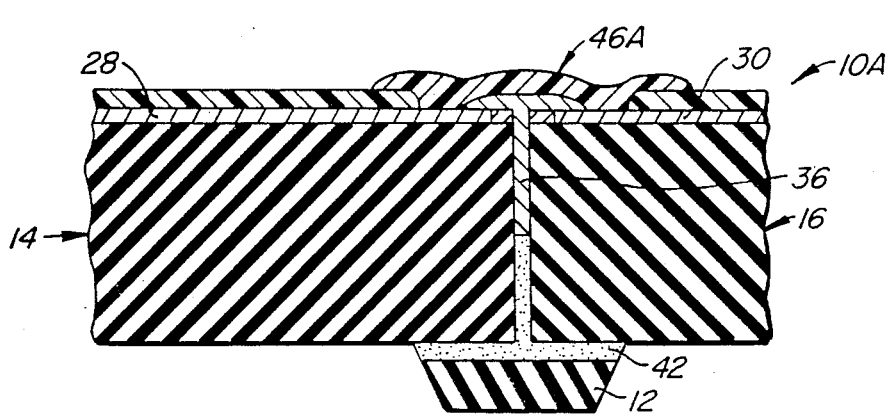
FIG._3.
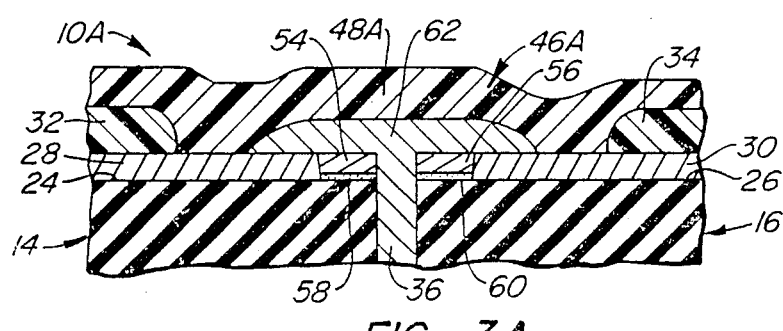
FIG._3A.

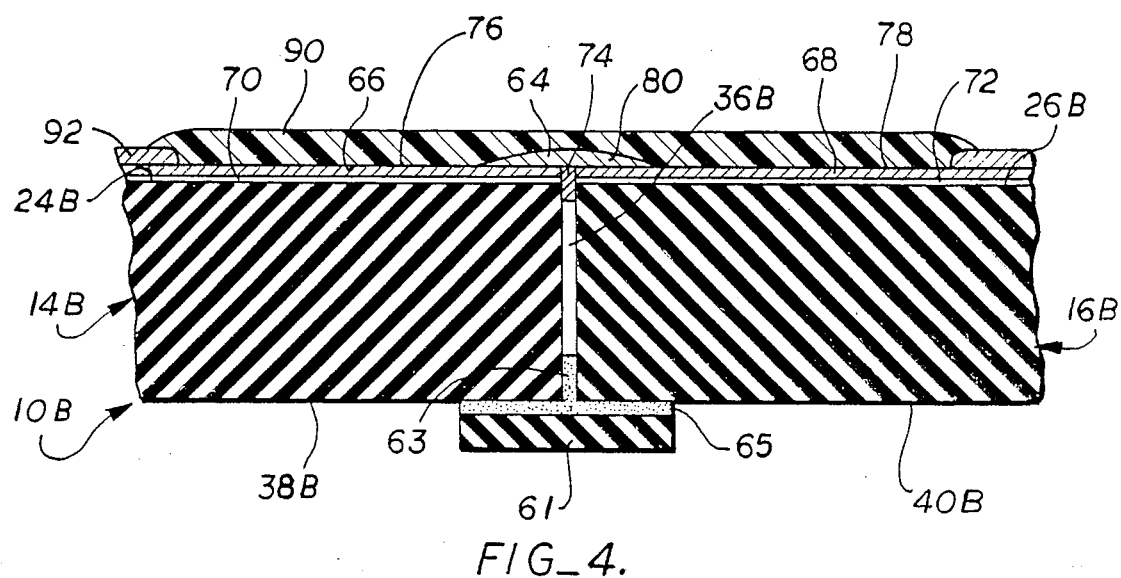
FIG_4.
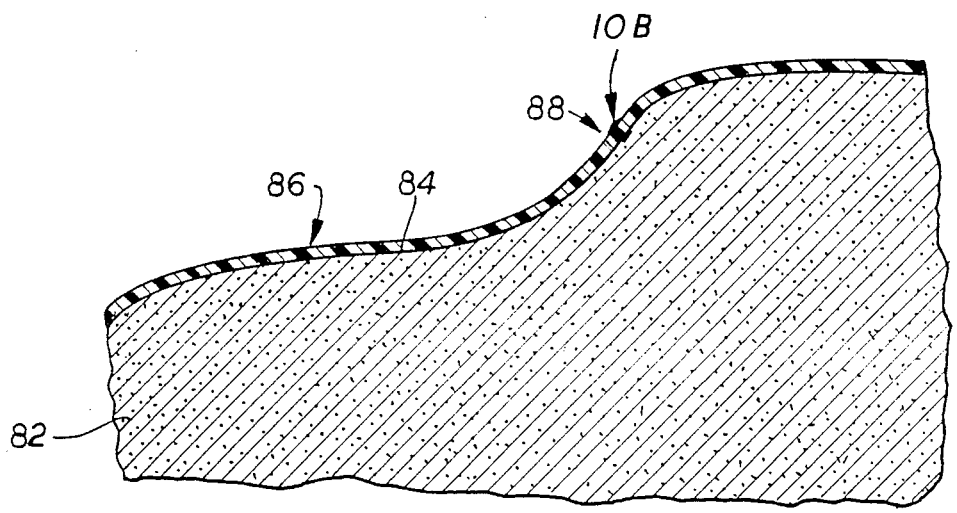
FIG_5.

SEAM FOR IMPENETRABLE MATERIAL

The present application is a continuation-in-part of patent application Ser. No. 140,383, Filed Jan. 4, 1988, now U.S. Pat. No. 4,806,435.

BACKGROUND OF THE INVENTION

The present invention relates to a novel seal for connecting abutting first and second sheets of laminated elastomeric and metallic materials.

Toxic chemicals may be found in a liquid medium and confined to a settling pond or tank. Often, such settling ponds are of earthen construction requiring liners to prevent the migration of toxic chemicals into the underlying soil and strata. It has been found that plastic materials for liners often permit the passage of hazardous chemicals therethrough. In addition, seams between sheets of plastic material are subject to breakage due to shifting subsurface phenomenon i.e.: earthquakes, land slides, and the like.

Reference is made to U.S. Pat. No. 4,588,646 which describes a protective sheet which may be employed as an article of clothing. Such protective sheet may also be employed to line hazardous waste ponds. A method of seaming such protective sheets would be a great advance in the field of hazardous waste handling and transportation.

SUMMARY OF THE INVENTION

In accordance with the present invention a novel and useful sealing and method for seaming metalized elastomeric sheets is provided.

The seal of the present invention utilizes an elastomeric strip which is attached by adhesive to the undersides of the abutting sheets lacking the overlying metallic portions. Adhesive may travel to the vertical space between the abutting sheets.

A metallic plug attaches to the overlying metallic portions of the top side of the abutting sheets and is intended for contacting the toxic material when used as a pond liner. The metallic plug may simply be a molten metal which is hardened to adhere to the metallic portion. Where the metallic layer of the abutting sheets has been omitted, worn, or removed, the metallic plug may, in part, take the form of metallic strips which are attached by adhesive to the elastomeric material along the seam joining the two sheets. Molten metallic material is then poured or spread over the metallic strips and attached thereto when hardened.

A layer of flexible and abrasion resistant material is then attached or applied as a coating over the metallic plug and the metallic portions of the abutting sheets.

The seal of the present invention may take another form where a elastomeric strip adheres to the nonmetallic sides of abutting metallized elastomeric sheets. An electrically conductive filler is applied to the metallic portion of and the gap between the abutting first and second sheets. A metallic coating is then placed on the electrically conductive filler. This may be achieved by a selective or brush plating process, which may be effectively accomplished when the first and second sheets are vertically oriented. A lacquer paint or varnish is brushed or rolled on the metallic coating to achieve a scratch resistant outer layer.

It has been found that the seal hereinabove described may be applied, in situ, manually or by automatic means. It should also be noted that metallic material presents a formidable barrier to the migration of the toxic material yet the seal of the present invention possesses flexibility which may accommodate shifting of the underlying surface material.

It may be apparent that a novel and useful seal for metalized elastomeric sheets has been described.

It is therefore an object of the present invention to provide a seal which presents the migration of toxic materials between adjacent metallized elastomeric sheets.

It is another object of the present invention to provide a seal for metallized elastomeric sheets which is flexible and simple to install in the field.

Another object of the present invention is to provide a seal for metallized elastomeric sheets which may be installed when the sheets are laid on a vertical surface.

The invention possesses other objects and advantages especially as concerns particular characteristics and features thereof which will described as the specification continues.

BRIEF DESCRIPTION OF THE DRAWINGS

FIG. 1 is a partial sectional view of one embodiment of the present invention.

FIG. 2 is a top plan view of a portion of the present invention showing the bottom elastomeric strip in place on a number of sheets.

FIG. 3 is a partial sectional view of another embodiment of the present invention employing metallic strips as a portion of the metallic plug.

FIG. 3a is an enlarged partial sectional view of the metallic plug portion of FIG. 3.

FIG. 4 is a sectional view of yet another embodiment of the present invention.

FIG. 5 is a sectional view of the seamed sheets of FIG. 4 in place on a vertically elevated surface.

DESCRIPTION OF THE PREFERRED EMBODIMENTS

Various aspects of the present invention will evolve from the following detailed description of the preferred embodiments of the present invention which should be referenced to the hereinabove described drawings.

The invention as a whole is shown in the drawings by reference character 10, or by a letter following reference character 10 when alternate embodiments are being described. Seal 10, FIG. 1, includes as one of its elements an elastomeric strip 12 which may be formed of butyl rubber, neoprene, and the like. Elastomeric strip 12 is used in conjunction with sheets 14, 16 and 18, FIGS. 1 and 2. With reference to FIG. 1 it may be seen that sheets 14 and 16 include an elastomeric portion 20 and 22, respectively. Surfaces 24 and 26 of sheets 14 and 16, respectively, include thin metallic layers 28 and 30, respectively. Layers or coatings 32 and 34 of flexible and abrasion resistant material such as lacquer or varnish, cover metallic layers 28 and 30. As may be surmised, the sheets 14 and 16 in FIG. 1 show the removal or absence of coats 32 and 34 adjacent the seam 36 at the abutment of sheets 14 and 16. Coats of 32 and 34 in this area may be purposefully omitted during the manufacture of sheets 14 and 16 or by physical removal after the manufacturing of sheets 14 and 16.

Elastomeric strip 12 is attached to surfaces 38 and 40 of sheets 14 and 16, respectively, by the use of adhesive 42, which may be contact cement or other known adhesives used for attaching elastomers to one another. It should be noted that adhesive 42 may travel into seam 36 between abutting sheets 14 and 16. With reference to FIG. 2, elastomeric strip 12 and another elastomeric strip 44 is depicted for connecting the under surfaces of sheets 14, 16 and 18 to one another. Thus, a multiplicity of sheets such as sheets 14, 16 and 18 may be adjoined in this manner.

The present invention also includes provision for a metallic plug 46, which is preferably of the same metallic composition as thin metallic layers 28 and 30, FIG. 1. Metallic plug, FIG. 1, may take the form of a molten metallic material, such as lead, copper, gold, and the like which is poured along surfaces 24 and 26 of sheets 14 and 16 along seam 36. Upon hardening, metallic plug 46 adheres to metallic layers 28 and 30 and may enter seam 36. A layer 48 of flexible and abrasion resistant material, such as a lacquer, varnish and the like, is applied over the top of metallic plug 46 and over, or adjacent, layers 32 and 34 of sheets 14 and 16. The sheets 14 and 16 lie on a ground surface 50 such that the surfaces 38 and 40 contact ground surface 50. Liquid body 52 lies in intimate contact with coatings 32 and 34, as well as layer 48 above metallic plug 46. Any toxic materials found in liquid body 52 must migrate through lacquer or varnish layers, metallic layers, and finally, elastomeric layers before reaching ground strata 50. It should be noted that shifting of ground strata 50 will be largely ameliorated by the elasticity inherent in sheets 14 and 16.

With reference to FIGS. 3 and 3A, it may be observed that an alternate embodiment 10A of the invention is depicted therein for use with sheets 14 and 16. As in the prior embodiment, elastomeric strip 12 is attached to sheets 14 and 16 via adhesive layer 42. Metallic plug 46A includes a pair of metallic strips 54 and 56 which extend along seam 36 between abutting sheets 14 and 16. Metallic strips 54 and 56 are attached to surfaces 24 and 26 by the use of adhesive layers 58 and 60 which may be a contact cement, similar to adhesive 42. Molten metallic material 62 is applied over metallic strips 58 and 60 as well as metallic layers 28 and 30 for adherence thereto upon cooling and hardening. A lacquer or varnish layer 48A is then applied to the top of molten metallic material 62 after hardening. It should be noted that lacquer layer 48A may override or abut lacquer (or varnish) coats 32 and 34. In addition, a strip of metallic material may be substituted for molten (cast) metallic material 62. In such a case this strip would overlay metallic strips 54 and be soldered to each strip 54 and 56.

With reference to FIG. 4 yet another embodiment 10B of the invention of the present application is depicted relative to metallized sheets 14B and 16B. An elastomeric strip, 61 adheres to surfaces 38B and 40B via adhesive 65. Seam or gap 36B accepts a portion 63 of adhesive 62 which travels along seam 36B toward upper surfaces 24B and 26B of sheets 14B and 16B. An electrically conductive filler 64, composed of a material such as a metallic epoxy, is placed on metallic layers 66 and 68 which have been cemented to surfaces 24B and 26B by glue or adhesive layers 70 and 72. It should be noted that metallic strips 66 and 68 extend completely along surfaces 24B and 26B, as is the case relative to the sheets 14 and 16 depicted in FIGS. 1-3A. Electrically conductive filler or resin 74 is then placed on the edges of the metallic layers 66 and 68 and into gap or seam 36B. As depicted in FIG. 4, filler 74 does not extend within gap 36B to adhesive portion 63, but does bridge the gap 36B between metallic layers 66 and 68. Conductive filler 74 may also extend to the upper surfaces 76 and 78 of metal layer 66 and 68, respectively, although this is not illustrated in FIG. 4. Conductive filler 74 is then plated with a metal coat 80, eg: by a selective or brush plating process. It should be noted that such a process may be achieved when surfaces 76 and 78 are vertically oriented. FIG. 5 illustrates such a situation where ground substrate 82 includes a surface 84 covered by impenetrable layer 86 including multiplicity of metallized sheets, comparable to sheets 14 and 16, sealed or seamed with seal 10B. Area 88 includes a vertical dimension which is susceptible to the application of seal 10, (noted schematically on FIG. 5) prior described.

Returning to FIG. 4, a layer 90 of flexible and scratch resistant material, such as a lacquer, paint, or varnish, covers metal coat 80 and metallic surfaces 76 and 78 of metal layers 66 and 68. Layer 90 meets and adheres to existing flexible and abrasion resistant layer 92, found on sheets 14B and 16B, (only illustrated on sheet 14A on FIG. 5).

In order to describe the invention more completely the following examples are given without intending to limit the invention to the specific examples set forth therein, except as they appear as limitations in the appended claims.

EXAMPLE I

Two butyl rubber sheets were seamed together edge-to-edge by using contact cement sold under the trademark "Duro". A strip of butyl rubber was bonded along and over the abutting edges of the two butyl rubber sheets on one side of the pair of rubber sheets. The contact cement interfaced the edges of the two butyl rubber sheets and the overlaying strip of butyl rubber. Several one inch strips of lead foil, 4 mils thick, 3 inches wide were attached to the other side of the bonded butyl rubber sheets by use of the same contact cement. The lead foil strips extended along either side of the seam between the bonded sheets. Lead in a Pyrex glass dish was heated to 350° C. and melted. The liquid lead was poured atop the lead foil strips along the junction between the butyl rubber sheets. The molten lead hardened on cooling and adhered well to the lead foil strips. The surface of the hardened molten lead and the lead foil were coated with a pigmented aqueous polyurethane.

EXAMPLE II

Two butyl rubber sheets are laminated on one side with a thin layer of lead. The lead is coated by a polyurethane lacquer. Both sheets are placed edge-to-edge with the lacquer coating oriented on the upper surface. A strip of butyl rubber is bonded with contact cement to the underside of the two sheets overlapping the seam between the two sheets, which also travels into the space between the abutting edges of the two sheets. Lacquer is removed along the upper surfaces of the sheets immediately adjacent the separating seam to reveal the underlying butyl rubber surface. Lead foil strips are bonded to the butyl rubber with contact cement another side of the seam. Molten lead is poured on the lead foil strips and adheres to the strip upon cooling. The cooled molten lead and adjacent lead foil is coated with an aqueous polyurethane, which also extends over the polyurethane coating on the upper surface of the two sheets.

EXAMPLE III

Two (4) inch wide strips of ¼ inch thick butyl rubber were placed in abutment. Each butyl rubber strip included a thin foil tape of copper on one surface which were oriented in side-by-side relationship at the abutment seam between the (4) inch rubber strips. A layer of rubber cement was applied to a (1) inch strip of butyl rubber and the (1) inch strip was fastened to the (4) inch strips on the sides having no copper foil tape across the seam between the abutting (4) inch strips. A silver filled epoxy was then placed on the copper foil tape in the vicinity of the abutment seam between the (4) inch strips to essentially fill the gap or seam between the 4 inch strips. The silver filled epoxy was then selective or finish plated with copper after sanding the edges of the hardened silver filled epoxy. A grey urethane waterborne protective coating was then placed over the copper coating and the copper plate.

EXAMPLE IV

Two (4) inch wide striped ¼ inch thick butyl rubber were placed in abutment. One surface of each butyl rubber strip included a (1) inch by (10) inch copper foil piece which were oriented side-by-side relationship at the abutment seam between the (4) inch rubber strips. Such copper foil was 0.025 inches thick of the type #259 distributed by K&S Engineering Co. of Chicago, Ill. Each copper foil piece was fastened to each rubber strip along the seam therebetween with contact cement. Acid flux was then applied to the top of each copper foil piece held to the butyl rubber strips. A propane torch was used to heat a soldering iron. The heated soldering iron was then used to apply solder to a third copper foil piece of approximately of the same dimension as the side-by-side copper foil pieces. The third copper foil piece was then soldered in over lapping fashion relative to the two side-by-side copper foil pieces. During the soldering process the copper foil pieces were pressed downwardly toward the butyl rubber stripes to prevent warping. Also, the temperature of the soldering iron wa carefully monitored to avoid melting through the copper foil pieces. In addition the soldered point between the third overlying copper foil piece and the two side-by-side copper foil pieces was pressed to insure wetting around the edges of the third copper foil piece. A continuous solder joint or filling between the third copper foil piece and the side-by-side copper foil pieces resulted.

EXAMPLE V

Two (4) inch wide striped ¼ inch thick butyl rubber were placed in abutment. One surface of each butyl rubber strip included a (1) inch by (10) inch brass foil piece which were oriented in side-by-side relationship at the abutment seam between the (4) inch rubber strips. Each brass foil piece was fastened to each rubber strip along the seam therebetween with contact cement. Acid flux was then applied to each brass foil piece held to the butyl rubber strips. A propane torch was used to heat a soldering iron. The heated soldering iron was then used to apply solder to a third brass foil piece of approximately of the same dimensions as the side-by-side brass foil pieces. The third brass foil piece was then soldered in over lapping fashion relative to the two side-by-side brass foil pieces. During the soldering process the brass foil pieces were pressed downwardly toward the butyl rubber strips to prevent warping. Also, temperature of the soldering iron was carefully monitored to avoid melting through the brass foil pieces. In addition, the soldered point between the third overlying brass foil piece and the two side-by-side brass foil pieces was pressed to insure wetting around the edges of the third brass foil piece. A continuous solder joint or filling between the third brass foil piece and the side-by-side brass foil pieces resulted.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A seal for connecting abutting first and second sheets with a gap therebetween, each sheet having an elastomeric portion with an elastomeric surface on one side, and an overlying metallic portion on the other side adjacent the gap thereof, comprising:
   a. an elastomeric strip;
   b. adhesive for attaching said elastomeric strip to said elastomeric portions of the one sides of the first and second sheets;
   c. an electrically conductive filler placed o the metallic portion of the abutting- first and second sheets on the gap between the first and second sheets;
   d. a metallic coating placed on the overlying metallic portions on the other sides of the first and second sheets, and on the electrically conductive filler; and
   e. a layer of flexible and abrasion resistant material attached to said metallic coating and the overlying metallic portions on the other sides of the first and second sheets.

2. The seal of claim 1 in which said electrically conductive filler is a metallic resin.

3. The seal of claim 2, in which said flexible and abrasion resistant material is a varnish.

4. The seal of claim 3 in which said flexible and abrasion resistant material is a paint.

5. The seal of claim 4 in which said flexible and abrasion resistant material is a lacquer.

6. A seal for connecting abutting first and second sheets with a gap therebetween, each sheet having an elastomeric portion with an elastomeric surface on one side, and an overlying metallic portion on the other side, adjacent the gap thereof, comprising:
   a. an elastomeric strip;
   b. adhesive for attaching said elastomeric strip to said elastomeric portions of the one sides of the first and second sheets;
   c. a pair of metallic pieces placed in adhering relationship to the metallic portions of each of the first and second sheets on the other sides thereof;
   d. a third metallic piece placed in adhering relationship to said first and second metallic strips and in bridging relationship to the gap between the first and second sheets.

7. The seal of claim 6 in which said third metallic piece is in adhering relationship to said first and second metallic pieces by solder.

8. The seal of claim 6 in which said first second and third metallic pieces are selected from the group consisting of brass and copper.

* * * * *